Sept. 22, 1931.    J. W. ASTLEY    1,824,005
CONNECTING DEVICE FOR USE WITH STRANDED METAL CABLES
Filed April 2, 1930    2 Sheets-Sheet 2
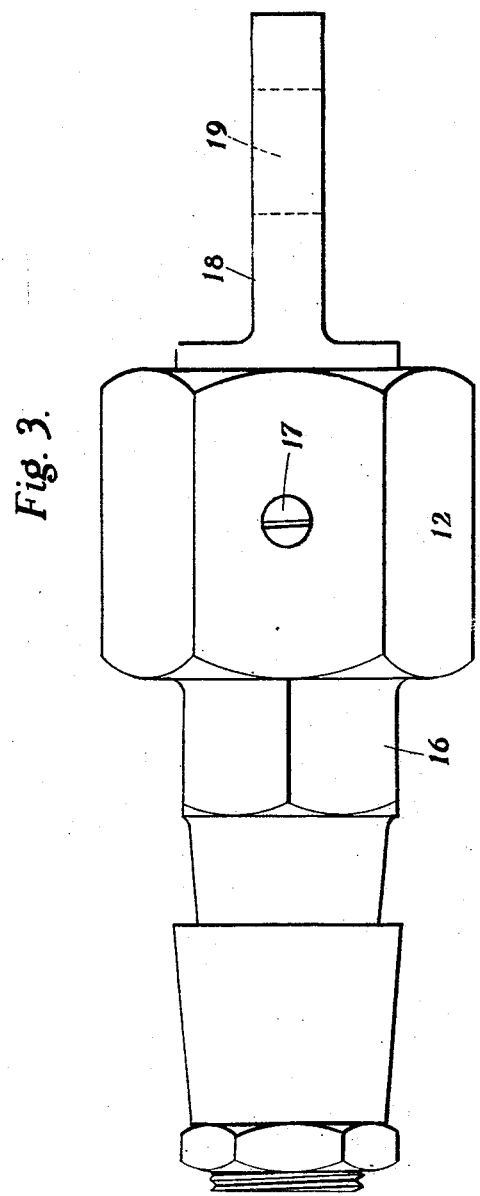
INVENTOR
John William Astley
BY
Byrnes, Stebbins, Parmelee & Blenko
ATTORNEY Patented Sept. 22, 1931

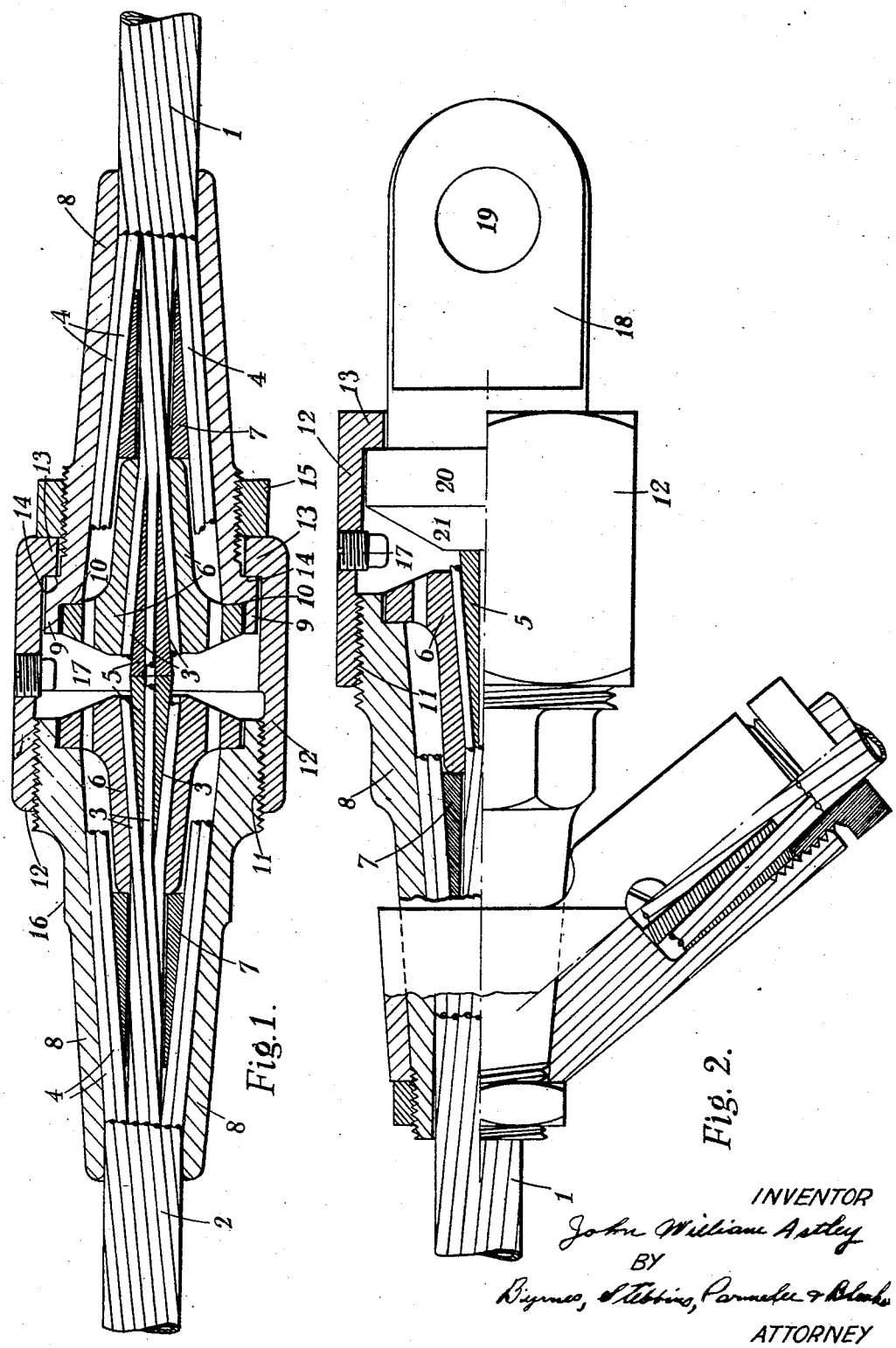

1,824,005

UNITED STATES PATENT OFFICE

JOHN WILLIAM ASTLEY, OF PRESCOT, ENGLAND, ASSIGNOR TO BRITISH INSULATED CABLES LIMITED, OF PRESCOT, ENGLAND, A BRITISH COMPANY

CONNECTING DEVICE FOR USE WITH STRANDED METAL CABLES

Application filed April 2, 1930, Serial No. 440,983, and in Great Britain May 22, 1929.

This invention relates to devices for connecting together the ends of two lengths of cable consisting of two concentric groups of wires or of an outer group of wires and a single central wire. Where these two groups are of different metals (for instance, a steel centre group and an aluminium outer group) it is desirable that the method of connection should provide a certain amount of independence between the connections of the two groups. The present invention provides in a simple and compact form this independence, making use of known means for gripping the ends of the wires or groups of wires by conical wedging actions resulting from the relative displacement of inner and outer cones. Instead of using the device for connecting together the ends of two lengths of cable, it may also be employed where it is required to connect a length of cable to a solid bar or eye or other body. In accordance with the invention we support the outer member of the conical clamp for the inner group on the outer member of the conical clamp for the outer group in such a way as to permit independent movement of the inner members of the clamping devices, while providing for the connecting together of the two cable ends, or of a cable end to another body, by a single sleeve.

If two lengths of cable are to be connected together we provide a flange or other lateral projection or projections on one of the outer conical members so arranged as to engage a seating or seatings on or in other outer conical members, so that when the clamping devices have been assembled, these two members are maintained in a definite relation to each other. The two inner conical members are however not restrained from movement relative to each other by this mounting and are free to take up the position determined by the wedging action in each case. The two outer members for the respective cable ends are joined together by a sleeve which is preferably screw threaded in one end only and has collar in the other end engaging behind a shoulder on the corresponding outer conical member. The sleeve and one outer conical member may be provided with flats to permit them to be engaged by spanners when the joint is being finally tightened up. If it is required to connect a cable to a solid bar or eye or other body and not to another length of cable, only one double clamping arrangement will be required, the other being replaced by an appropriately formed solid metal body having a shoulder or an external thread to engage with the corresponding part of the connecting sleeve.

Two forms of construction in accordance with the invention are illustrated by way of examples, in the accompanying drawings, wherein:—

Fig. 1 shows a longitudinal section of a device for connecting together the ends of two lengths of cable, Fig. 2 shows a longitudinal view partly in section of a device for connecting a length of cable to a solid bar provided with an eye, and Fig. 3 is a plan view of Fig. 2.

In Fig. 1, the ends 1 and 2 of the two lengths of cable are connected together by pairs of inner and outer cones and as the construction and arrangement of these are the same for the two ends, only one arrangement as employed for the end 1 need be described. The wires comprising the end 1 consist of an inner group of wires 3, which may be of steel, and an outer group of wires 4, which may be of aluminium. The inner group of wires 3 are gripped by means of an inner cone 5 and an outer cone 6, and the outer group of wires 4 are gripped by an inner cone 7 and an outer cone 8. The inner cone 5 is made in two halves to receive the central wire of the inner group of wires 3, and the other wires of this group are gripped between the outer cone 6 and the inner cone 5. The wires of the inner group pass with clearance through the inner cone 7 and the outer group of wires 4 are gripped between the inner cone 7, and the outer cone 8. The inner cone 5 may be a solid cone or it may have a bore to receive a number of the wires 3. In the case where the central part of the cable consists of a single wire, the inner cone 5 and the outer cone 6 will be made of such dimensions that they fit together and the central wire will be gripped between the two halves of the cone 5 in the same way that the central wire of the inner group is gripped in the example illustrated.

The inner end of the outer cone 8 has a flange 9 so that a recess is formed, one wall 10 of which serves as an abutment for the outer cone 6 when the cones are gripping the outer and inner groups of wires. The outer cone 8 is also formed with a shoulder 14 forming an abutment for a projection 13 on one end of a sleeve 12. The latter is adapted to screw on to a threaded portion 11 on the outer cone 16 shown to the left of Fig. 1. After the cones have been assembled, the sleeve 12 is screwed up gently but firmly in order to complete the joint. A lock-nut 15 may be provided to reinforce the shoulder of the sleeve 12 and prevent the latter from unscrewing. To facilitate the screwing-up of the sleeve 12, the latter and the portion 16 of the left hand outer cone 8 may have flats as shown in Fig. 3.

The wires of the cable are gripped by the wedging action of the cooperating pairs of inner and outer cones. The inner cones 7 are driven into the outer cones 8 to grip the outer group of wires 4 and the inner cones 5 are driven into the outer cones 6 to grip the inner wires 3, the wires of the outer group being cut off somewhat shorter than those of the inner group. In this construction, the outer cones 6 are caused to take up a definite position relatively to the outer cones 8, although the inner cones 5 and 7 are not prohibited from moving relatively to each other but are free to take up their position as determined by the wedging actions in each case. A filling screw 17 for introducing protective compound may be provided in the sleeve 12. The inner cones 5 will be arranged generally so that they project inwardly to a certain extent beyond the outer cones 6, so that the tightening-up of the sleeve 12 tends to wedge the cones 5 still more firmly into the cones 6.

In Figs. 2 and 3, the end 1 of a cable is shown connected to a solid bar 18 provided with an eye 19 for attachment to an insulator on a pole for example. The arrangement for clamping the end of the cable is the same as just described and consists of an inner cone and an outer cone for the inner wires and inner and outer cones for the outer group of wires. The sleeve 12 has a projection 13 which engages behind a collar 20 on the bar 18 when the sleeve 12 is screwed up. The bar 18 may have an inwardly projecting portion 21 which abuts against the inner end of the cone 5 when the sleeve 12 is screwed up. The arrangement shown in these figures includes provision for tapping off a branch connection. Such provision forms no part of the present invention.

What I claim as my invention and desire to secure by Letters Patent is:—

1. A device for connecting an end of a length of cable, comprising an outer group of wires and a core consisting of an inner group of wires or a single central wire, to another member, said device comprising an inner clamping cone for the core, an inner clamping cone for the outer group of wires, an outer clamping cone for the outer group of wires and having a seating on it, a flanged outer clamping cone for the core supported on the seating of the outer clamping cone for the outer group of wires, and a single sleeve for connecting said cable end to the other member.

2. A device for connecting together the ends of two lengths of cable, each cable having an outer group of wires and a core consisting of an inner group of wires or a single central wire, said device comprising an inner clamping cone for each core, an inner clamping cone for each of the outer groups of wires, an outer clamping cone for each outer group of wires and having a seating on it, a flanged outer clamping cone for each of the cores supported on the seating of the appropriate outer clamping cone for the outer group of wires, a single sleeve for engagement with each outer clamping cone for the outer groups of wires, and a lock-nut on one of said outer clamping cones for the outer group of wires.

3. A device for connecting an end of a length of cable, comprising an outer group of wires and a core consisting of an inner group of wires or a single central wire, to another member, said device comprising an inner clamping cone for the core, an outer clamping cone for the core having a flange laterally extending from its end of greater diameter, an inner clamping cone for the outer group of wires, an outer clamping cone for said group, said outer clamping cone having a conical extension, which surrounds the outer cone for the core and which has at its end of greater diameter a seating to receive the flange on that outer cone, and a sleeve engaging the extension of the outer conical member for the outer group of wires and connecting said cable end to the other member.

In testimony whereof I affix my signature.

JOHN WILLIAM ASTLEY.